United States Patent
Mitchell et al.

(10) Patent No.: US 9,009,234 B2
(45) Date of Patent: Apr. 14, 2015

(54) COMPLEX EVENT PROCESSING SYSTEM HAVING MULTIPLE REDUNDANT EVENT PROCESSING ENGINES

(75) Inventors: Robert Scott Mitchell, Cambridge (GB); Mark K. Horsburgh, Cambridge (GB); Richard M. Bentley, Witham (GB)

(73) Assignee: Software AG (DE)

( * ) Notice: Subject to any disclaimer, the term of this patent is extended or adjusted under 35 U.S.C. 154(b) by 663 days.

(21) Appl. No.: 12/026,254

(22) Filed: Feb. 5, 2008

(65) Prior Publication Data

US 2008/0189352 A1 Aug. 7, 2008

Related U.S. Application Data

(60) Provisional application No. 60/888,506, filed on Feb. 6, 2007.

(51) Int. Cl.
| | |
|---|---|
| G06F 15/16 | (2006.01) |
| H04L 1/18 | (2006.01) |
| G06F 9/54 | (2006.01) |
| H04L 1/22 | (2006.01) |

(52) U.S. Cl.
CPC .............. *H04L 1/1809* (2013.01); *G06F 9/542* (2013.01); *H04L 1/22* (2013.01); *G06F 2209/544* (2013.01)

(58) Field of Classification Search
CPC ....... H04L 29/06; H04L 41/22; H04L 1/1809; H04L 1/22
USPC ........................... 709/203, 206, 217, 219, 223
See application file for complete search history.

(56) References Cited

U.S. PATENT DOCUMENTS

| | | |
|---|---|---|
| 5,245,616 A | 9/1993 | Olson |
| 5,392,398 A | 2/1995 | Meyer |
| 5,596,720 A | 1/1997 | Hamada et al. |
| 5,758,354 A | 5/1998 | Huang et al. |
| 5,765,033 A | 6/1998 | Miloslavsky |
| 5,805,825 A | 9/1998 | Danneels et al. |
| 5,822,526 A | 10/1998 | Waskiewicz |
| 5,850,525 A | 12/1998 | Kalkunte et al. |

(Continued)

OTHER PUBLICATIONS

Mitchell, Scott. "Apama Release 3.0—Continous Availability: High Availability Design." Jun. 2006. Document submitted with U.S. Appl. No. 60/888,506.*

(Continued)

*Primary Examiner* — Frantz Jean
(74) *Attorney, Agent, or Firm* — Wilmer Cutler Pickering Hale and Dorr LLP (57) ABSTRACT

A system and method for replicating a distributed computer system state among a plurality of deterministic event processing engines are disclosed. A sender module receives a plurality of input events or input event streams and generates a serialized message sequence describing an order in which input events are processed. The serialized message sequence is then transmitted to a plurality of deterministic event processing engines for processing. As the event processing engines are deterministic, each event processing engine produces the same ordered sequence responsive to the received serialized message sequence. The ordered sequences from each deterministic event processing engine are transmitted to a merger module which generates an output from the plurality of ordered sequences. The merger module removes one or more redundant ordered sequences and associates the resulting output with a client device.

27 Claims, 6 Drawing Sheets (56) References Cited

U.S. PATENT DOCUMENTS

| | | |
|---|---|---|
| 5,857,201 A | 1/1999 | Wright, Jr. et al. |
| 5,870,605 A | 2/1999 | Bracho et al. |
| 5,878,056 A | 3/1999 | Black et al. |
| 5,951,648 A | 9/1999 | Kailash |
| 5,999,967 A | 12/1999 | Sundsted |
| 6,016,515 A | 1/2000 | Shaw et al. |
| 6,061,559 A | 5/2000 | Eriksson et al. |
| 6,091,724 A | 7/2000 | Chandra et al. |
| 6,112,323 A | 8/2000 | Meizlik et al. |
| 6,128,646 A | 10/2000 | Miloslavsky |
| 6,145,781 A | 11/2000 | Kawabe et al. |
| 6,167,445 A | 12/2000 | Gai et al. |
| 6,289,212 B1 | 9/2001 | Stein et al. |
| 6,298,455 B1 | 10/2001 | Knapman et al. |
| 6,336,119 B1 | 1/2002 | Banavar et al. |
| 6,359,635 B1 | 3/2002 | Perttunen |
| 6,397,352 B1 | 5/2002 | Chandrasekaran et al. |
| 6,452,934 B1 | 9/2002 | Nakata |
| 6,453,346 B1 | 9/2002 | Garg et al. |
| 6,484,198 B1 | 11/2002 | Milovanovic et al. |
| 6,513,154 B1 | 1/2003 | Porterfield |
| 6,643,682 B1 | 11/2003 | Todd et al. |
| 6,647,544 B1 | 11/2003 | Ryman et al. |
| 6,728,715 B1 | 4/2004 | Astley et al. |
| 6,732,175 B1 | 5/2004 | Abjanic |
| 6,782,386 B1 | 8/2004 | Gebauer |
| 6,792,460 B2 | 9/2004 | Oulu et al. |
| 6,801,604 B2 | 10/2004 | Maes et al. |
| 6,807,636 B2 | 10/2004 | Hartman et al. |
| 6,816,898 B1 | 11/2004 | Scarpeli et al. |
| 6,854,088 B2 | 2/2005 | Massengale et al. |
| 6,898,556 B2 | 5/2005 | Smocha et al. |
| 6,901,447 B2 | 5/2005 | Koo et al. |
| 6,944,662 B2 | 9/2005 | Devine et al. |
| 6,970,945 B1 | 11/2005 | Berkman et al. |
| 6,983,479 B1 | 1/2006 | Salas et al. |
| 7,007,278 B2 | 2/2006 | Gungabeesoon |
| 7,028,089 B2 | 4/2006 | Agarwalla et al. |
| 7,039,701 B2 | 5/2006 | Wesley |
| 7,096,263 B2 | 8/2006 | Leighton et al. |
| 7,103,054 B2 | 9/2006 | Novaes |
| 7,110,406 B1 | 9/2006 | Ennis et al. |
| 7,171,628 B1 | 1/2007 | Perttunen |
| 7,177,929 B2 | 2/2007 | Burbeck et al. |
| 7,251,689 B2 | 7/2007 | Wesley |
| 7,287,097 B1 | 10/2007 | Friend et al. |
| 7,295,952 B1* | 11/2007 | Cheng et al. .................. 702/185 |
| 7,302,634 B2 | 11/2007 | Lucovsky et al. |
| 7,334,022 B2 | 2/2008 | Nishimura et al. |
| 7,349,980 B1 | 3/2008 | Darugar et al. |
| 7,359,919 B2 | 4/2008 | Cohen et al. |
| 7,379,967 B2 | 5/2008 | Miller et al. |
| 7,386,630 B2 | 6/2008 | Liong et al. |
| 7,395,349 B1 | 7/2008 | Szabo et al. |
| 7,406,440 B2 | 7/2008 | Napier et al. |
| 7,406,537 B2 | 7/2008 | Cullen |
| 7,418,501 B2 | 8/2008 | Davis et al. |
| 7,433,835 B2 | 10/2008 | Frederick et al. |
| 7,464,154 B2 | 12/2008 | Dick et al. |
| 7,467,196 B2 | 12/2008 | Di Luoffo et al. |
| 7,487,510 B1 | 2/2009 | Carr |
| 7,496,637 B2 | 2/2009 | Han et al. |
| 7,512,957 B2 | 3/2009 | Cohen et al. |
| 7,516,191 B2 | 4/2009 | Brouk et al. |
| 7,533,172 B2 | 5/2009 | Traversat et al. |
| 7,539,656 B2 | 5/2009 | Fratkina et al. |
| 7,543,280 B2 | 6/2009 | Rosenthal et al. |
| 7,603,358 B1 | 10/2009 | Anderson et al. |
| 7,702,636 B1 | 4/2010 | Sholtis et al. |
| 7,711,836 B2* | 5/2010 | Videlov et al. ................ 709/230 |
| 7,747,980 B2 | 6/2010 | Illowsky et al. |
| 7,752,604 B2 | 7/2010 | Genkin et al. |
| 7,761,847 B2 | 7/2010 | Kornerup et al. |
| 7,801,946 B2 | 9/2010 | Bearman |
| 7,801,976 B2 | 9/2010 | Hodges et al. |
| 7,802,229 B2 | 9/2010 | Kornerup et al. |
| 7,881,992 B1 | 2/2011 | Seaman et al. |
| 7,887,511 B2 | 2/2011 | Mernoe et al. |
| 7,895,262 B2 | 2/2011 | Nielsen et al. |
| 7,941,542 B2 | 5/2011 | Broda et al. |
| 7,992,102 B1 | 8/2011 | De Angelo |
| 8,001,232 B1 | 8/2011 | Saulpaugh et al. |
| 8,060,553 B2 | 11/2011 | Mamou et al. |
| 2001/0007993 A1 | 7/2001 | Wu |
| 2002/0010781 A1 | 1/2002 | Tuatini |
| 2002/0026473 A1 | 2/2002 | Gourraud |
| 2002/0107992 A1 | 8/2002 | Osbourne et al. |
| 2002/0161826 A1 | 10/2002 | Arteaga et al. |
| 2002/0165745 A1 | 11/2002 | Greene et al. |
| 2003/0005174 A1 | 1/2003 | Coffman et al. |
| 2003/0014733 A1 | 1/2003 | Ringseth et al. |
| 2003/0041178 A1 | 2/2003 | Brouk et al. |
| 2003/0055920 A1 | 3/2003 | Kakadia et al. |
| 2003/0061404 A1 | 3/2003 | Atwal et al. |
| 2003/0074579 A1 | 4/2003 | Della-Libera et al. |
| 2003/0093500 A1 | 5/2003 | Khodabakchian et al. |
| 2003/0101210 A1 | 5/2003 | Goodman et al. |
| 2003/0106039 A1 | 6/2003 | Rosnow et al. |
| 2003/0115317 A1 | 6/2003 | Hickson et al. |
| 2003/0120665 A1 | 6/2003 | Fox et al. |
| 2003/0135556 A1 | 7/2003 | Holdsworth |
| 2003/0145281 A1 | 7/2003 | Thames et al. |
| 2003/0172368 A1 | 9/2003 | Alumbaugh et al. |
| 2003/0188198 A1 | 10/2003 | Holdsworth et al. |
| 2003/0204644 A1 | 10/2003 | Vincent |
| 2003/0231596 A1* | 12/2003 | Hong ............................ 370/252 |
| 2004/0027995 A1 | 2/2004 | Miller et al. |
| 2004/0030947 A1 | 2/2004 | Aghili et al. |
| 2004/0034664 A1 | 2/2004 | Jain et al. |
| 2004/0054770 A1 | 3/2004 | Touboul |
| 2004/0078440 A1 | 4/2004 | Potter et al. |
| 2004/0088140 A1 | 5/2004 | O'Konski et al. |
| 2004/0133633 A1 | 7/2004 | Fearnley et al. |
| 2004/0186817 A1 | 9/2004 | Thames et al. |
| 2004/0193703 A1 | 9/2004 | Loewy et al. |
| 2004/0216127 A1 | 10/2004 | Datta et al. |
| 2004/0225724 A1 | 11/2004 | Pavlik et al. |
| 2005/0027853 A1 | 2/2005 | Martin et al. |
| 2005/0038708 A1 | 2/2005 | Wu |
| 2005/0097480 A1 | 5/2005 | Care |
| 2005/0289508 A1 | 12/2005 | Illowsky et al. |
| 2006/0031481 A1 | 2/2006 | Patrick et al. |
| 2006/0041461 A1 | 2/2006 | Vucina et al. |
| 2006/0041859 A1 | 2/2006 | Vrancic et al. |
| 2006/0069603 A1 | 3/2006 | Williams et al. |
| 2006/0074732 A1 | 4/2006 | Shukla et al. |
| 2006/0173985 A1 | 8/2006 | Moore |
| 2006/0195819 A1 | 8/2006 | Chory et al. |
| 2006/0206440 A1 | 9/2006 | Anderson et al. |
| 2006/0224702 A1 | 10/2006 | Schmidt et al. |
| 2006/0230432 A1 | 10/2006 | Lee et al. |
| 2006/0265461 A1 | 10/2006 | Davies et al. |
| 2006/0294499 A1 | 12/2006 | Shim |
| 2007/0174393 A1 | 7/2007 | Bosschaert et al. |
| 2007/0192678 A1 | 8/2007 | Tang et al. |
| 2007/0268300 A1 | 11/2007 | (Janet) et al. |
| 2007/0271573 A1* | 11/2007 | Chandrasekaran ........... 719/318 |
| 2008/0046861 A1 | 2/2008 | Grieser |
| 2008/0059220 A1 | 3/2008 | Roth et al. |
| 2008/0120574 A1 | 5/2008 | Heredia et al. |
| 2008/0120593 A1 | 5/2008 | Keren et al. |
| 2008/0126932 A1 | 5/2008 | Elad et al. |
| 2008/0127052 A1 | 5/2008 | Rostoker |
| 2008/0141237 A1 | 6/2008 | Elad et al. |
| 2008/0148346 A1 | 6/2008 | Gill et al. |
| 2008/0163164 A1 | 7/2008 | Chowdhary et al. |
| 2008/0172270 A1 | 7/2008 | Eckenroth |
| 2008/0307369 A1 | 12/2008 | Liu et al. |
| 2009/0262131 A1 | 10/2009 | Suntinger et al. |
| 2009/0276771 A1 | 11/2009 | Nickolov et al. |
| 2009/0319832 A1 | 12/2009 | Zhang et al. |
| 2009/0326997 A1 | 12/2009 | Becker et al. |

(56) References Cited

U.S. PATENT DOCUMENTS

| | | |
|---|---|---|
| 2010/0017853 A1 | 1/2010 | Readshaw |
| 2010/0030718 A1 | 2/2010 | Anderson et al. |
| 2010/0304992 A1 | 12/2010 | An et al. |

OTHER PUBLICATIONS www.progress.com "Progress Apama Algorithmic Trading: The Industry Leading Algorithmic Trading Platform." [Retreived Online on Dec. 12, 2009] 2006. [Retreived form the Internet] <URL: http://web.archive.org/web/20060207093354/www.progress.com/realtime/products/apama/index.ssp>.*
Bentley, Richard. "Fault Tolerance Design, Tasks and Estimates." Mar. 2002. Document submitted with U.S. Appl. No. 60/888,506.*
"A powerful new tool to help validated error-handling code," Nov. 2004, pp. 1-4, Compuware Corporation.
"Agitator," online retrieved on Feb. 15, 2005) Retrieved from the internet ,URL:http://www.agitar.com/products/000024.html., pp. 1-5, Agitar Software, Inc.
"AmberPoint Express", (online, retrieved on Dec. 23, 2004), Retrieved from the internet ,URL:http://www.amberpoint.com/solutions/express_print.html., pp. 1-2, AmberPoint Solutions.
"Extensible Markup Language (XML) 1.0 (Second Edition)", Oct. 6, 2000 (online, retrieved on Aug. 3, 2006), Retrieved from the internet <URL:htt;://www.w3.org/TR/2000/REC-xml-20001006>, pp. 1-43, W3C.
"Interoperability: The Key to Quality Web Services," Mar. 2004 (online) retrieved on Nov. 17, 2004; Retrived from the internet: <URL:http://www.mindreef.com/products.whitepapers/whitepaper-2html>, pp. 1-9, Mindreef, Inc., (no longer available on the internet).
"ProactiveNet 6.0 Optimize Application Performance to Meet Business Objectives" 2004, pp. 1-4, ProactiveNet, Inc., CA.
Abbreviated Examination Report, GB0517847.0, Dec. 1, 2005 (1 page).
Barton, J.J. et al., "SOAP Messages with Attachments," World Wide Web Consortium, W3C Note, Dec. 11, 2000, retrieved online on Jul. 24, 2003, from <URL:http://www.w3.org/TR/SOAP-attachments> (8 pages).
Bilorusets et al.; Web Services Reliable Messaging Protocol (WS-ReliableMessaging); Feb. 2005; http://msdn.microsoft.com/library/en-us/dnglobspec/html/WS-ReliableMessaging.pdf (40 pages).
Biron P.V. et al., "XML Schema Part 2: Datatypes," World Wide Web Consortium, W3C Recommendation, May 2, 2001, retrieved online Jul. 11, 2003, retrieved from <URL:http://www.w3.org/TR/xmischema-2> (116 pages).
Box, D. et al., "Simple Object Access Protocol (SOAP) 1. 1," World Wide Web Consortium, W3C Note, May 8, 2000, retrieved online on Jul. 23, 2003, retrieved from <URL:http://www.w3.org.TR/2000/NOTE-SOAP-20000508/> (28 pages).
Bray, T. et al., Extensible Markup Language (XML) 1.0 (Second Edition), World Wide Web Consortium, W3c Recommendation, Oct. 6, 2001, retrieved online on Jul. 11, 2003, retrieved from RL:http://www.w3.org/TR/REC-xml> (44 pages).
Christensen, E. et al., "Web Services Description Language (WSDL) 1.1," World Wide Web Consortium, W3C Note, Mar. 15, 2001, retrieved online on Jul. 11, 2003, retrieved from <URL:http://www.w3.org.TR/wsdl> (40 pages).
Clark, J. et al., "XML Path Language (Xpath)," World Wide Web Consortium, W3C Recommendation, Nov. 16, 1999, retrieved online on Jul. 11, 2003, retrieved from <URL:http://www.w3.org/TR/xpath> (119 pages).
Clark, J., "XSL Transformations (XSLT) Version 1.0," World Wide Consortium W3C Recommendation, Nov. 16, 1999, retrieved online on Jul. 11, 2003, retrieved from <URL:http://www.w3.org/TRxsit> (28 pages).
Copyright © OASIS, 2001, "Oasis/ebXML Registry Information Model v1.0 DRAFT, OASIS/ebXML Registry Technical Committee," retrieved online on Jun. 27, 2001, retrieved from <URL:http://www.oasis-open.org/committees/regrap/documents/rimv1.0.doc> (43 pages).
Copyright © UN/CEFACT and OASIS, 2001, "Message Service Specification, ebXML Transport, Routing & Packaging, Version 1.0," retrieved online on May 11, 2001, retrieved from <URL:http://www.ebxml.org/specs/ebMS.pdf> (75 pages).
Corba Messaging 22: Common Object Request Broker Architecture (CORBA), v3.0.3; Mar. 2004; http://www.omg.org/docs/formal/04-03-12.pdf (100 pages).
Fallside, D.C., "XML Schema Part 0: Primer," World Wide Web Consortium, W3C Recommendation, May 2, 2001, retrieved on Jul. 11, 2003, retrieved from <URL:http://www.w3.org/TR/xmischema-0> (57 pages).
Final Office Action dated Oct. 18, 2005 from U.S. Appl. No. 10/015,502 (29 pages).
International Search Report issued for PCT/US04/03674, dated Oct. 13, 2004 (1 page).
International Search Report/Written Opinion issued for PCT/US08/52928 dated Jul. 25, 2008 (8 pages).
Martin, B. "Build distributed applications with Java and XML," Feb. 2000, (online, retrieved on Jun. 10, 2005), Retrieved from the internet ,URL: http://www.javaworld.com/javaworld/jw-02-2000/JW-02-ssj-xml_phtml>, pp. 103 Java World.
Merrick, P. et al., "Web Interface Definition Language (WIDL)," World Wide Web Consortium, Submitted to W3C Sep. 22, 1997, © 1997, webMethods, Inc., retrieved online on Aug. 11, 2003, retrieved from <URL:http://www.w3.org/TR/NOTE-widl> (16 pages).
Mitchko, J. "Mindreef SOAPscope 1.0", (online, retrieved on Sep. 27, 2004), retrieved from the internet <URL:http://www.sys-con.com/webservices/articleprint.cfm?id+597., pp. 1-3, SYS-CON Media, Inc.
Notification Service Specification; Object Management Group; Version 1.1 formal/04-10-13; Oct. 2004; http://www.omg.org/docs/formal/04-10-13.pdf (118 pages).
Office Action dated Aug. 5, 2005 from U.S. Appl. No. 10/015,501 (8 pages).
Office Action dated Mar. 28, 2005, issued in U.S. Appl. No. 10/015,502 (26 pages).
Progress Software, Apama Event Modeler v2.0 Professional Edition & Client Edition, Published Apr. 1, 2005 (selected pages, United Kingdom of Great Britain (13 pages).
Schaffner, Brian, "Debug SOAP apps with Apache TCP Tunnel/Monitor", Jan. 30, 2003 (online, retrieved on Dec. 23, 2004), Retrieved from the internet ,URL:hhttp://www.builder.com.com/5102-6389-1049605.html., pp. 1-2, CNET Networks, Inc.
Thompson, H.S. et al., "XML Schema Part 1: Structures," World Wide Web Consortium, W3C Recommendation, May 2, 2001, retrieved on Jul. 11, 2003, retrieved from <URL:http://www.w3.org/TR/xmischema-1> (151 pages).
Transmission Control Protocol; Darpa Internet Program Protocol Specification; Sep. 1981; http://www.ietf.org/rfc/rfc0793.txt?number=793 (84 pages).
Web Services Reliable Messaging TC WS-Reliability 1.1; Oasis Open 2003-2004; Oasis Standard , Nov. 15, 2004; http://docs.oasis-open.org/wsrm/ws-reliability/v1.1/wsrm-ws_reliability-1.1-spec-os.pdf (74 pages).

\* cited by examiner

COMPLEX EVENT PROCESSING SYSTEM HAVING MULTIPLE REDUNDANT EVENT PROCESSING ENGINES

CROSS REFERENCE TO RELATED APPLICATIONS

This application claims priority from U.S. Provisional Patent Application No. 60/888,506, titled "A Technique And Process To Provide Continuous Availability For Complex Event Processing, Through The Application Of Multiple Redundancy And Deterministic Event Engines," filed Feb. 6, 2007, which is incorporated by reference herein in its entirety.

BACKGROUND

1. Field of Art

The present invention generally relates to the field of distributed computer systems, and more specifically, to increasing the availability of a distributed complex event processing system.

2. Description of the Related Art

Complex Event Processing (CEP) computer systems recognize input events, or patterns of input events, within one or more input event streams and perform an action responsive to detecting an input event or input event pattern. In some configurations, the CEP system receives input from multiple sources, such as multiple computers.

Conventional CEP systems use multiple components to process events. An event processing engine detects one or more particular events in an input event stream and triggers output actions or alerts when certain events are detected. Filters or adapters are used to modify the input so that regardless of the initial input format, the event processing engine receives input in a consistent format and generates output in a format suitable for subsequent use. Many configurations include additional components for configuring, managing and monitoring system operation.

Commonly, the event processing engine and the filters are implemented using a combination of hardware and software. For example, general purpose computer hardware running multiple software processes is used to implement the event processing engine as a software process. Alternatively, the event processing engine is implemented using multiple software processes running on a plurality of separate computer systems as a distributed computer system.

However, different components of the distributed computer system, such as the communication network, the computer hardware and the software running on the computer hardware, can fail independently of each other. For example, if one of the separate computer systems fails, software running on the failed computer system is moved from the failed computer system to another computer system within the distributed computer system and other distributed computer systems continue operating. This failure of different system components adversely affects overall system operation. In particular, component failure causes data loss, delayed or incorrect outputs and inoperability of all or part of the distributed computer system.

SUMMARY

One embodiment of a disclosed system and method uses a plurality of deterministic event processing engines to replicate a system state between multiple event processing engines. In an embodiment, a sender module receives an input event(s) or an input event stream(s) and generates a serialized message sequence. The serialized message sequence includes an input event or an input event stream and associated sequence numbers. The sequence numbers are used to specify the order in which the input events should be processed. The serialized message sequence is then transmitted to and processed by a plurality of deterministic event processing engines. As the event processing engines are deterministic, each event processing engine produces the same output, an ordered sequence of output messages, responsive to a received serialized message sequence. By processing the serialized message sequence with a plurality of event processing engines, the generated ordered sequence of output messages can be retrieved from any event processing engine, allowing event processing to continue uninterrupted when a particular event processing engine fails. The ordered sequence of output messages from any one of the deterministic event processing engines is transmitted to a merger module which removes redundant ordered sequences and sends output results or actions to a client device. In one embodiment, redundant ordered sequences are discarded and the output result or action of the remaining ordered sequence is associated with a client device that is to receive the output result.

The features and advantages described in the specification are not all inclusive and, in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

Figure (FIG.) 1 is a block diagram of a distributed computing system for event processing according to one embodiment of the invention.

DETAILED DESCRIPTION

A system and method for replicating a distributed computer system state among a plurality of deterministic event processing engines are described. For purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

Figure 1:
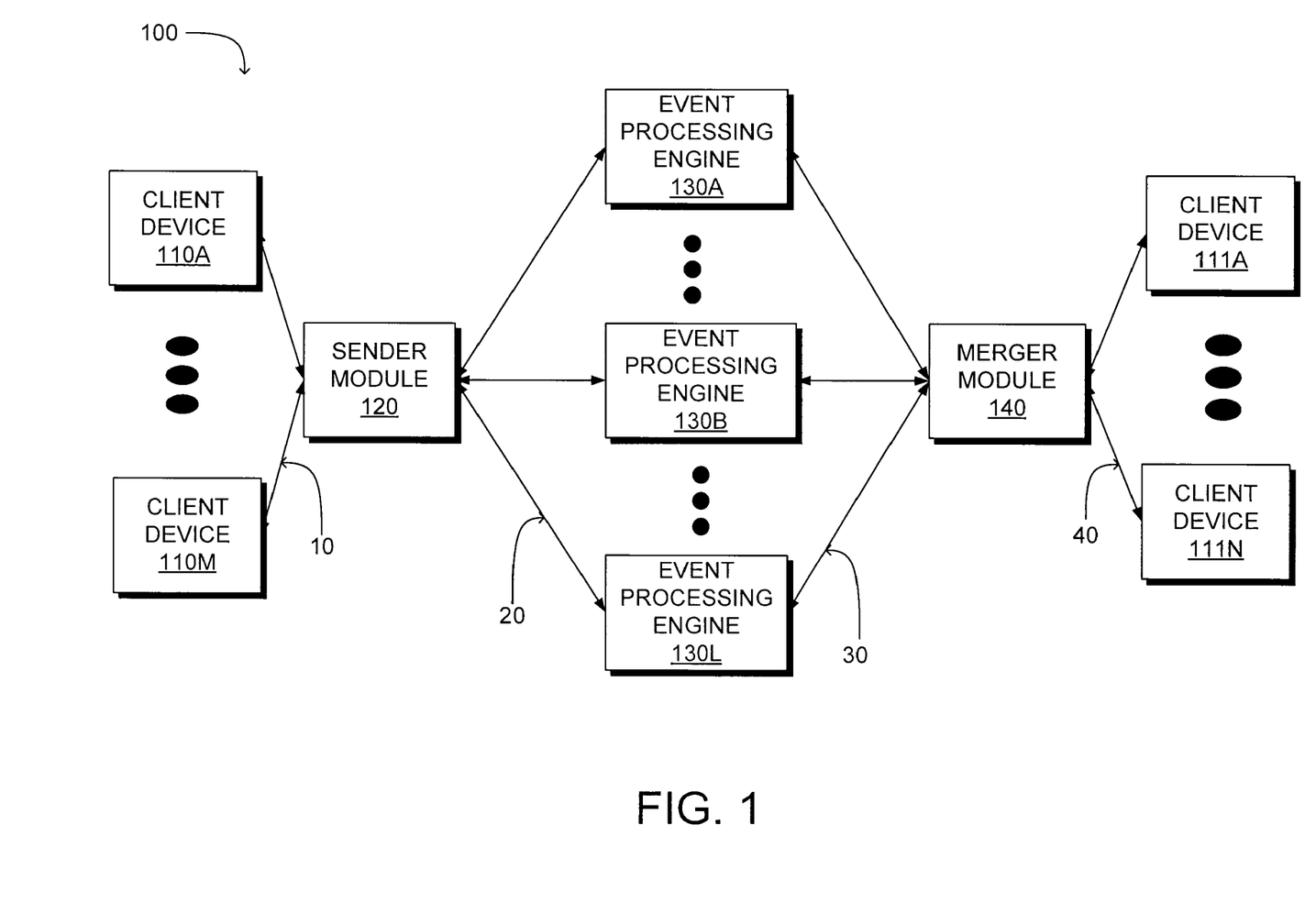

FIG. 1 illustrates one embodiment of a distributed computing system 100 for event processing according to the present invention. The distributed computing system 100 comprises one or more input client devices 110A-M, a sender module 120, a plurality of event processing engines 130A-L, a merger module 140 and one or more output client devices 111A-N. In one embodiment, the distributed computing system 100 comprises a network (represented in FIG. 1 by input links 10, 30 and output links 20, 40) allowing the input client devices 110A-M, the sender module 120, the event processing engines 130A-L, the merger module 140 and the output client devices 111A-N to communicate with each other.

The input client devices 110A-M include computing capabilities and data communication capabilities. Multiple input client devices 110A-M are used by the distributed computing system 100 to simultaneously receive multiple inputs. For example, the distributed computing system 100 receives input from different users through different input client devices 110A-M.

The output client devices 111A-N include computing capabilities and data communication capabilities. The output client devices 111A-N are used by the distributed computing system 100 to generate multiple outputs. For example, the distributed computing system 100 uses the output client devices 111A-N to provide output to multiple users. The input client devices 110A-M may operate simultaneously with the output client devices 111A-N, and in one embodiment, one or more particular client devices may be both an input client device 110A-M and an output client device 111A-N.

In an embodiment, the input client devices 110A-M use an input event or an input event stream(s) comprising multiple input events to communicate data or instructions to the sender module 120. Transmissions between the input client devices 110A-M and the sender module 120 comprise input events which describe occurrences. In one embodiment, the transmitted input events comprise an event header and an event body. The event header comprises an event identifier, an event type, an event name, a time stamp and an event occurrence number. The event body comprises a description of the occurrence, for example a description of a product having sales below a threshold.

In addition to events, the input client devices 110A-M can also transmit monitoring messages to monitor, modify or configure the operation of the event processing engine 130A-L. The monitoring messages modify the triggers installed in the event processing engines 130A-L. These monitoring messages can install new code within the event processing engines 130A-L which instantiates one or more new triggers and/or they can delete code that already exists within the event processing engines 130A-L, thus deactivating one or more triggers. As well as changing one or more triggers, the actions that are taken in response to triggers may also be modified using a monitoring message.

The sender module 120 also includes computing capabilities and data communication capabilities. The sender module 120 receives input events or input event streams from multiple input client devices 110A-M and generates a serialized message sequence including input events or input event streams and/or monitor messages for transmission to the event processing engines 130A-L. The serialized message sequence also includes temporal data associated with the received input events and/or monitoring messages. The temporal data enables the input events included in a serialized message sequence to have a common or uniform temporal reference. This common temporal reference allows multiple event processing engines 130A-L to generate the same ordered sequence for triggers which depend on the time between input events. Without a common temporal reference this form of trigger would fail to be deterministic because each event processing engine 130A-L would have a different notion of time. Similarly, the monitoring messages included in the serialized message sequence also have temporal data that is used in a similar fashion. In one embodiment, the same temporal reference is used for both the input events and the monitoring messages. This increases fault tolerance of the distributed computing system 100 by permitting retrieval of the event processing result from any one of the event processing engines 130A-L in the common state. Those skilled in the art will recognize that the sender 120 can generate a plurality of serialized message sequences, and in one embodiment, the plurality of serialized message sequences use a common temporal reference.

In an embodiment, the sender module 120 receives acknowledgement messages from the event processing engines 130A-L indicating receipt of a serialized message sequence by the event processing engines 130A-L. The sender module 120 may also store a copy of the serialized message sequence including input events, monitoring events and temporal data until the acknowledgement message is received from multiple event processing engines 130A-L. In one embodiment, the copy of the serialized message sequence is stored in a manner that preserves the serialized message sequence even if the sender module 120 fails.

The event processing engines 130A-L receive a serialized message sequence from the sender module 120, process the serialized message sequence, and in some cases generate an ordered sequence of output messages. In one embodiment, the event processing engines 130A-L comprise one or more software or firmware processes running on a plurality of general purpose computer hardware devices which communicate with each other through a communication network. Alternatively, the event processing engines 130A-L comprise multiple software or firmware processes running on a general purpose computer hardware device. The event processing engines 130A-L are deterministic. As used herein, "deterministic" means that different event processing engines 130A-L generate the same ordered sequence of output messages if both event processing engines 130A-L receive the same serialized message sequence. Because receipt of each input event modifies the state of an event processing engine, two deterministic event processing engines 130A-L will be in the same state provided both deterministic event processing engines 130A-L process input events in the same order. Thus, if different event processing engines 130A-L each receives the same serialized message sequences having input events in the same order, the different event processing engines 130A-L generate an identical ordered sequence of output messages. Using a plurality of deterministic event processing engines 130A-L produces a plurality of redundant ordered sequences of output messages responsive to the same serialized message sequence of input events, allowing the merger module 140 to use any one of the redundant ordered sequences of output messages from the event processing engines 130A-L to generate the output results sent to the output client devices 111A-N. Therefore, the output client devices 111A-N are unaffected by the failure of one event processing engine 130A-L, and avoid having to re-process input events not received during failure.

The event processing engines 130A-L may temporarily store copies of ordered sequences of output messages until receiving or processing an acknowledgement from the merger module 140. However, the copies of ordered sequences of output messages stored by the event processing engines 130A-L need not be stored persistently since multiple event processing engines 130A-L are used to provide redundancy. As each event processing engine 130A-L stores a copy of each ordered sequence of output messages, if one event processing engine 130A-L fails, an identical ordered sequence of output messages to that of the failed event processing engine 130A-L can be retrieved from any operational event processing engine 130A-L because the event processing engines 130A-L are deterministic. Because each event processing engine 130A-L receives the same input and generates the same output, each event processing engine 130A-L maintains independent copies of the distributed computing system 100 state.

Hence, examining any event processing engine 130A-L allows the distributed computing system 100 state to be determined for some point within the serialized message sequence coming from the sender module 120. Thus as long as at least one event processing engine 130A-L remains operational, the distributed computing system 100 can continue event processing and the state of the distributed computing system 100 is maintained. Further, having each event processing engine 130A-L have the same state as all others at a given point in the serialized message sequence means that a new event processing engine 130A-L can be instantiated from the state of another. For example, if a particular event processing engine 130A-L fails, then another can be started and resume event processing by retrieving the state of the distributed computing system 100 from an operational engine 130A-L. The operational engine's state will include the point within the serialized message sequence to which that event processing engine 130A-L has processed. Therefore, the new engine can resume processing by requesting that the sender module 120 send all messages from that point on to it. This process will also allow maintenance to be done on the event processing engines 130A-L by instantiating new engines to take their place while they are unavailable.

Those skilled in the art will recognize that a serialized message sequence processed by an event processing engine 130A-L may produce no ordered sequence of output messages, an ordered sequence with one output message, or an ordered sequence with a plurality of output messages. There is not a one-to-one relationship between a serialized message sequence and an ordered sequence of output messages.

In one embodiment, the merger module 140 includes data processing and data communication capabilities and receives an ordered sequence of output messages from each event processing engine 130A-L. Each ordered sequence of output messages is identical and can therefore each can be regarded as a separate instance of the same sequence. The merger module 140 forwards the output results or actions from the ordered sequence of output messages (or some subset of them) on to any output client device 111A-N that is interested. In one embodiment, the merger module 140 generates groups of output results or actions to be sent to each output client device 111A-N. Each group contains output results or actions that were received from the event processing engines 130A-L, in the same order that they were generated by the event processing engines 130A-L, but potentially with some output results or actions missing, depending on which output results or actions a given output client device 111A-N wishes to receive. In one embodiment, the group of output results or actions sent to each output client device 111A-N has their sequence numbers changed as will be understood by those skilled in the art. In one embodiment, the merger module 140 transmits an acknowledgement message to multiple event processing engines 130A-L indicating when the ordered sequence of output messages has been received or processed. This acknowledgement message could be for a single ordered sequence or multiple ordered sequences. The merger module 140 also may locally store the current position of processing in the serialized message sequence in such a way that the stored current position of processing in the serialized message sequence is retained even if the merger module 140 fails. Hence, if the merger module 140 fails, the stored current position in the serialized message sequence is retrieved and transmitted to the event processing engines 130A-L which then retransmits the ordered sequence of output messages starting from the stored current position.

In one embodiment, a network is used to transmit data or instructions between or among the input client devices 110A-M, the sender module 120, event processing engines 130A-L, the merger module 140 and the output client devices 111A-N. As shown in FIG. 1, input links 10, 30 and output links 20, 40 indicate data transmission between the input client devices 110A-M, the sender module 120, the event processing engines 130A-L, the merger module 140 and the output client devices 111A-N using the network. The network may comprise a conventional wireless data communication system, for example, general packet radio service (GPRS), IEEE 802.11 (or WiFi), IEEE 802.16 (or WiMax), Bluetooth, or any other suitable wireless communication system. Alternatively, the network may comprise a conventional wired data communication system, such as Ethernet, digital subscriber line (DSL), integrated services digital network (ISDN), or any other suitable wired communication system. In an embodiment, the network comprises a combination of a wireless communication system and a wired communication system. For example, input link 10 and output link 40 comprise wireless communication channels and output link 20 and input link 30 comprise wired communication channels.

Hence, the sender module 120 receives an input event(s) or input event stream(s) from one or more input client devices 110A-M and generates a single serialized message sequence by combining the input event(s) or input event stream(s) from one or more input client devices 110A-M. The sender module 120 assigns a sequence number to each input event in the serialized message sequence so that the sequence number describes the order in which the input events in the serialized message sequence are to be processed. This serialized message sequence is then transmitted to a plurality of deterministic event processing engines 130A-L. The plurality of deterministic event processing engines 130A-L each produce the same ordered sequence of output messages as each deterministic event processing engine 130A-L processes input events in the order specified by the serialized message sequence. The plurality of deterministic event processing engines 130A-L transmits the ordered sequence of output messages to the merger module 140. The merger module 140 then associates ordered sequences received from the plurality of deterministic event processing engines 130A-L with output client devices 111A-N and transmits the output results or actions from the output messages associated with an output client device 111A to that output client device 111A without transmitting the output results or actions from the output messages not associated with the output client device 111A. This similarly occurs for the other output client devices 111B-N.

Figure 2:
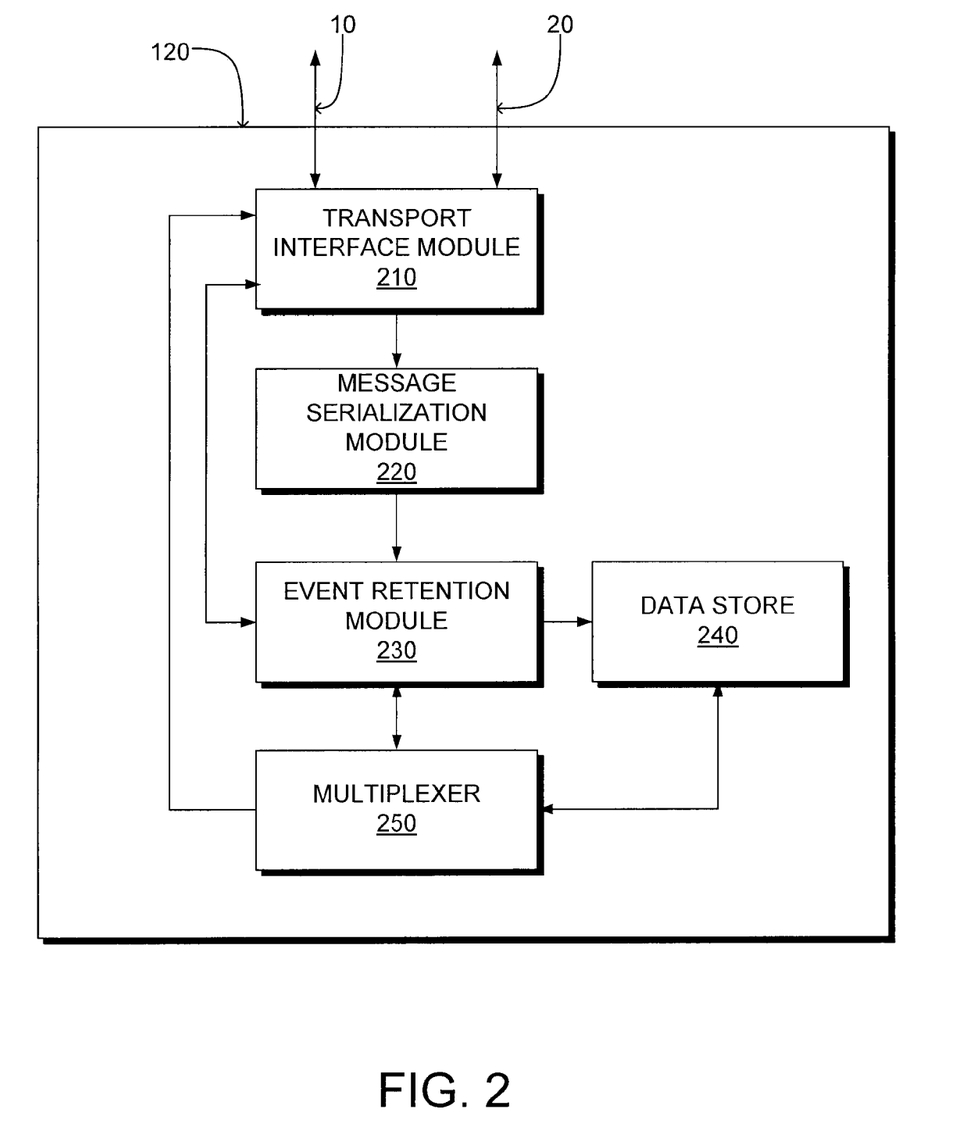
FIG. 2 is a block diagram of a sender module for generating a serialized message sequence according to one embodiment of the invention.

FIG. 2 is a block diagram of a sender module 120 for generating a serialized message sequence according to one embodiment of the invention. The sender module 120 receives multiple input events or input event streams from input link 10 and generates a serialized message sequence including the input events designated as having a specified order. The serialized message sequence is transmitted to the event processing engines 130A-L using output link 20. In one embodiment, the sender module 120 comprises a transport interface module 210, a message serialization module 220, an event retention module 230, a data store 240 and a multiplexer 250. In an embodiment, the transport interface module 210, the message serialization module 220, the event retention module 230 and/or the multiplexer 250 further described below, comprise multiple software processes for execution by a processor (not shown) and/or firmware applications. The software and/or firmware processes and/or applications can be configured to operate on a general purpose microprocessor or controller, a field programmable gate array (FPGA), an application specific integrated circuit (ASIC) or a combination thereof. In another embodiment, the modules comprise portions or sub-routines of a software or firmware application that multiplexes events or event sequences. Moreover, other embodiments can include different and/or additional features and/or components than the ones described here.

The transport interface module 210 receives input events or input event streams from input client devices 110A-M. In one embodiment, the transport interface module 210 applies filtering and/or reformatting operations to normalize the received input events or input event streams to a standardized format. For example, the transport interface module 210 decouples communications of the sender module 120 from external transports and protocols, such as by providing a Common Object Request Broker Architecture (CORBA) interface for external communications to transmit and receive data from multiple input client devices 110A-M implemented using various computer languages. The transport interface module 210 also transmits acknowledgement messages to an input client device 110A-M indicating when the sender module 120 has received or processed an input event or input event stream. For example, the transport interface module 210 transmits an acknowledgement message to an input client device 110A-M when the input event from that input client device 110A-M is included in the serialized message sequence and has been persistently stored by the sender module 120. Additionally, the transport interface module 210 receives acknowledgement messages from one or more event processing engines 130A-L indicating when the event processing engines 130A-L have processed a serialized message sequence.

In an embodiment, the transport interface module 210 comprises a transceiver such as for infrared communication, Bluetooth communication, 3G communication, radio frequency communication, or any other wireless communication technique. In an alternative embodiment, the transport interface module 210 comprises a conventional wired connection, such as Ethernet, Universal Serial Bus (USB) or other wired communication techniques. Alternatively, the transport interface module 210 comprises both a wired connection and a transceiver. The transport interface module 210 allows data, commands and/or information to be distributed using network protocols, such as Transmission Control Protocol (TCP), Internet Protocol (IP), Hypertext Transmission Protocol (HTTP) or other protocols capable of communicating data or information.

The message serialization module 220 generates a serialized message sequence from an input event(s) or input event stream(s). In one embodiment, the message serialization module 220 adds temporal data such as by assigning a sequence number, such as an integer, to each received input event. This sequence number is associated with the received input event and indicates when the input event was received by the sender module 120. Hence, the sequence number supplements the event data and allows unique identification of each input event from a combination of event source, event destination and sequence number. In one embodiment, as new input events are received, the sequence number is incremented by a fixed amount. For example, the message serialization module 220 uses a monotonically-incrementing counter so that new input events are assigned a sequence number one greater than the sequence number associated with the previously received input event. Hence, in one embodiment, if the current input event processed by the sender module 120 is associated with a sequence number of N, the next input event received is associated with a sequence number of N+1. Therefore, the sender module 120 specifies the order in which the event processing engines 130A-L are to process the input events.

The event retention module 230 determines whether the sender module 120 retains an input event and its associated sequence number. Initially, when an input event is received by the sender module 120 and has been assigned a sequence number by the message serialization module 220, the event retention module 230 stores a copy of the input event and its sequence number in the data store 240. In one embodiment, this amounts to storing the serialized message sequence. The event retention module 230 determines whether an acknowledgement message corresponding to a serialized message sequence that included the input event has been received from the event processing engine 130A-L. Until the event processing engines 130A-L receive or process the serialized message sequence, the serialized message sequence including the input event(s) and its associated sequence number(s) remain stored in the data store 240. In one embodiment, the sender module 120 stores copies of the serialized message sequences until processing is completed, ensuring the serialized message sequences are accessible until processed by all the event processing engines 130A-L. This method of retention allows the event processing engines 130A-L to access earlier serialized message sequences if necessary for error handling or other processing and allows the distributed computing system 100 to recover the state of a failed event processing engine 130A-L. Those skilled in the art will recognize that the amount of redundancy may be varied by requiring acknowledgement messages from a subset fewer than all of the event processing engine 130A-L before discarding stored input events and sequence numbers.

Data store 240 stores a copy of received input events or input event streams and the associated sequence numbers. The data store 240 comprises a hard disk drive, a flash memory device or other suitable non-volatile mass storage device capable of persistently storing data. Alternatively, the data store 240 comprises a combination of a non-volatile storage device capable of persistently storing data and a volatile storage device (e.g., dynamic random access memory (DRAM), static random access memory (SRAM) or another suitable memory device).

The multiplexer 250 multiplexes serialized message sequences for transmission to multiple event processing engines 130A-L. For example, in one embodiment, a first client device 110A sends a first input event stream and a second client device 110B sends a second input event stream to the sender module 120. After the first and second event streams are serialized by message serialization module 220 they are sent to the multiplexer 250 that can combine the two serialized message sequences into a single serialized message sequence for transmission to the multiple event processing engines 130A-L. The multiplexer 250 also retransmits any serialized message sequences to event processing engines 130A-L that have not transmitted an acknowledgement message to the sender module 120 within a specified time interval or that transmit an error message to the sender module 120. In various embodiments, the multiplexer 250 transmits or retransmits the serialized message sequence using any suitable network protocols.

Although described in FIG. 2 above as discrete modules, in various embodiments, any or all of the transport interface module 210, the message serialization module 220, the event retention module 230 and/or the multiplexer 250 can be combined. This allows a single module to perform the functions of one or more of the above-described modules.

Figure 3:
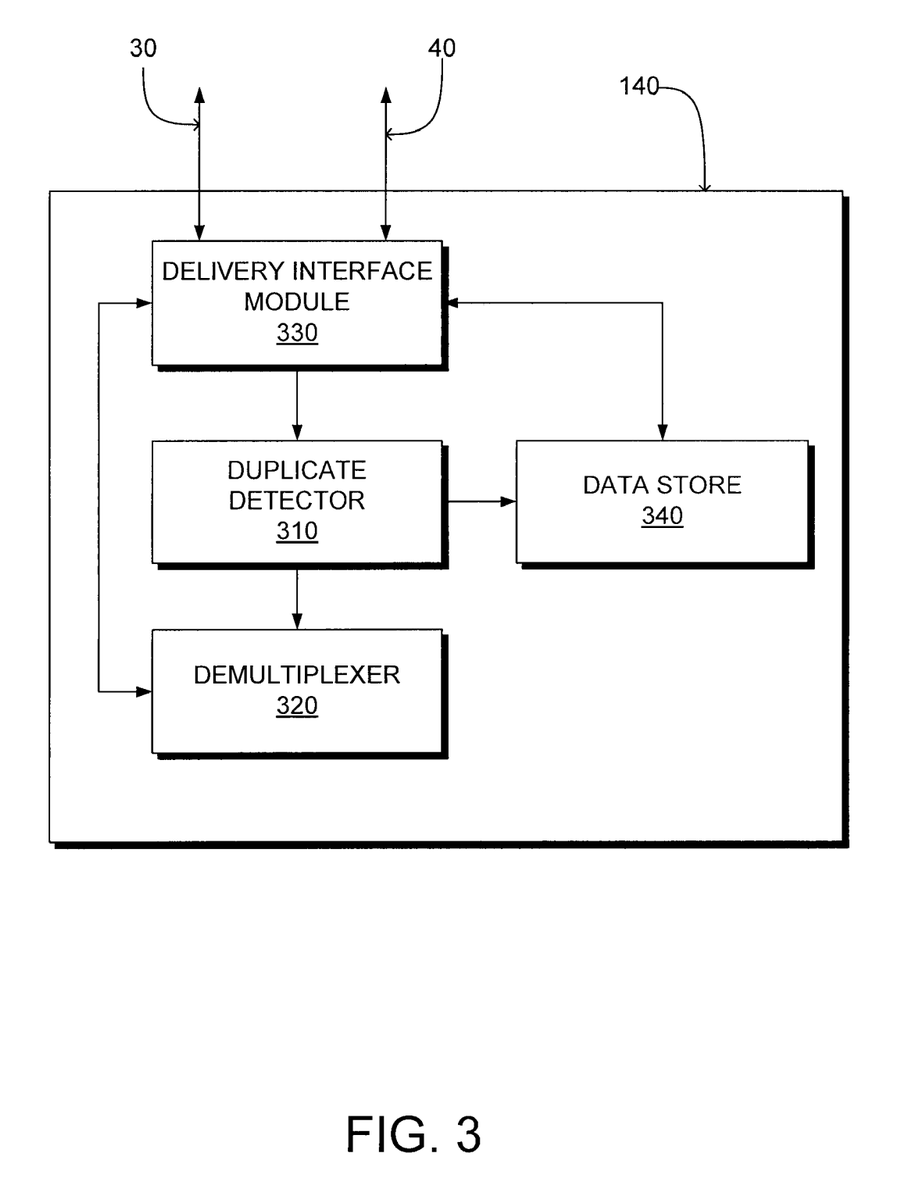
FIG. 3 is a block diagram of a merger module for generating an output result or action according to one embodiment of the invention.

FIG. 3 is a block diagram of a merger module 140 for sending output results or actions according to one embodiment of the invention. The merger module 140 receives multiple ordered sequences of output messages from a plurality of event processing engines 130A-L via input link 30 and forwards output results or actions on for transmission to one or more output client devices 111A-N using output link 40. In one embodiment, the merger module 140 comprises a delivery interface module 330, a duplicate detector 310, a data store 340 and a demultiplexer 320. In an embodiment, the delivery interface module 330, the duplicate detector 310 and/or the demultiplexer 320, further described below, comprise multiple software processes for execution by a processor (not shown) and/or firmware applications. The software and/or firmware processes and/or applications can be configured to operate on a general purpose microprocessor or controller, a field programmable gate array (FPGA), an application specific integrated circuit (ASIC) or a combination thereof. In another embodiment, the modules comprise portions or sub-routines of a software or firmware application for processing multiple event sequences. Moreover, other embodiments can include different and/or additional features and/or components than the ones described here.

The delivery interface module 330 receives ordered sequences of output messages from the event processing engines 130A-L and transmits acknowledgement messages to the event processing engines 130A-L after the ordered sequences of output messages are received or processed by the merger module 140. In one embodiment, the delivery interface module 330 transmits an acknowledgement message when the ordered sequence of output messages is received. In one embodiment, the delivery interface module 330 may also transmit an output result or action generated by the demultiplexer 320 to an output client device 111A-N. For example, the delivery interface module 330 receives the output of the demultiplexer 320 and transmits it to one or more output client devices 111A-N. Additionally, the delivery interface module 330 transmits a control command to the data store 340 to delete a stored ordered sequence of output messages after the delivery interface module 330 receives an acknowledgement message from output client devices 111A-N indicating receipt or processing of the output results or actions contained in the ordered sequence of output messages. If the merger module 140 fails and recovers, the delivery interface module 330 also transmits the position of the merger module 140 in processing the ordered sequence of output messages to the event processing engines 130A-L. This position can be measured in terms of the sequence number of the input event that when processed by the event processing engines 130A-L yielded the ordered sequence of output messages being processed by the merger module 140. For example, the merger module 140 transmits the sequence number of the last input event in the serialized message sequence transmitted corresponding to an output result or action sent to an output client device 111A-N or the sequence number of the input event in the serialized message sequence being processed before failure. In various embodiments, the delivery interface module 330 comprises a transceiver for wireless communication, a conventional wired connection or a combination of a wireless transceiver and a wired connection.

As the merger module 140 receives ordered sequences of output messages from multiple event processing engines 130A-L, the duplicate detector 310 removes redundant instances of the ordered sequences so one ordered sequence remains. In one embodiment, the duplicate detector 310 examines the sequence number associated with the received ordered sequences and discards ordered sequences associated with sequence numbers less than the highest sequence number associated with the ordered sequence received from any event processing engine 130A-L. As the event processing engines 130A-L are deterministic, each produces the same the ordered sequence responsive to an input, so multiple ordered sequences associated with the same sequence number are redundant.

The data store 340 stores output results or actions that are transmitted to an output client device 111A-N, the most recent sequence number transmitted by each event processing engine 130A-L, and the most recent acknowledgement message sent to each event processing engine 130A-L. This allows the merger module 140 to request retransmission of the most recent ordered sequence in response to a failure. In one embodiment, the data store 340 also stores a copy of the ordered sequences received from multiple event processing engines 130A-L, allowing subsequent comparison of the event processing engine 130A-L outputs to verify that the event processing engines 130A-L produce the same output. In an embodiment, the data store 340 also stores a copy of output results or actions that have been transmitted to an output client device 111A-N and keeps the output results or actions stored until the appropriate output client device(s) 111A-N acknowledges receipt of the output results or actions. For example, the data store 340 stores output results or actions until it receives a delete command from the demultiplexer 320 indicating the receipt of an acknowledgement of output results or actions by the output client device(s) 111A-N.

The demultiplexer 320 receives the output results or actions from the duplicate detector 310. Additionally, the demultiplexer 320 receives by way of the delivery interface module 330 data such as acknowledgment messages from the output client devices 111A-N indicating which output client devices 111A-N have received the output results or actions. In one embodiment, the demultiplexer 320 maintains data associating the output client devices 111A-N with one or more ordered sequences and modifies this association data as the ordered sequences associated with output client devices 111A-N change. This allows the demultiplexer 320 to deliver the appropriate output results or actions to different output client devices 111A-N even when the ordered sequences of output messages associated with an output client devices 111A-N change during event processing. The demultiplexer 320 generates different groups or subsets of output results or actions, for different output client devices 111A-N. Each group or subset includes those output results or actions corresponding to the ordered sequences of interest to the particular output client device 111A.

By way of example and as described above, input streams from a first and a second input client devices 110A, 110B may have been combined into a single serialized message sequence. The processing of that single serialized message sequence by the event processing engines 130A-L yields one ordered sequence of output messages. However, the output results and actions contained in the ordered sequence may need to be divided out such that a first output client device 111A receives the processing results of the first input stream while a second output client device 111B receives the processing results of the second input stream. The association of the output client devices 111A-N with ordered sequences enables this functionality and the demultiplexer 320 divides the output results or actions into different subsets using the association so that the two groups of processing output results can be sent to different output client devices 111A-N as desired.

Further, when the delivery interface module 330 receives acknowledgement messages from output client devices 111A-N, these acknowledgement messages are communicated to the demultiplexer 320 which associates the acknowledgement messages with ordered sequences. This association of acknowledgement messages with ordered sequences allows the merger module 140 to remove ordered sequences and their corresponding output results or actions from the data store 340 after receipt by all of the appropriate output client devices 111A-N.

Although described in FIG. 3 above as discrete modules, in various embodiments, the delivery interface module 330, the duplicate detector 310 and/or the demultiplexer 320 can be combined in any number of ways. This allows a single module to perform the functions of one or more of the above-described modules.

Although described in FIG. 2 and FIG. 3 as discrete modules, in various embodiments, the sender module 120 and the merger module 140 can be combined allowing a single module to perform the functions of the sender module 120 and the merger module 140.

System Operation

Figure 4:
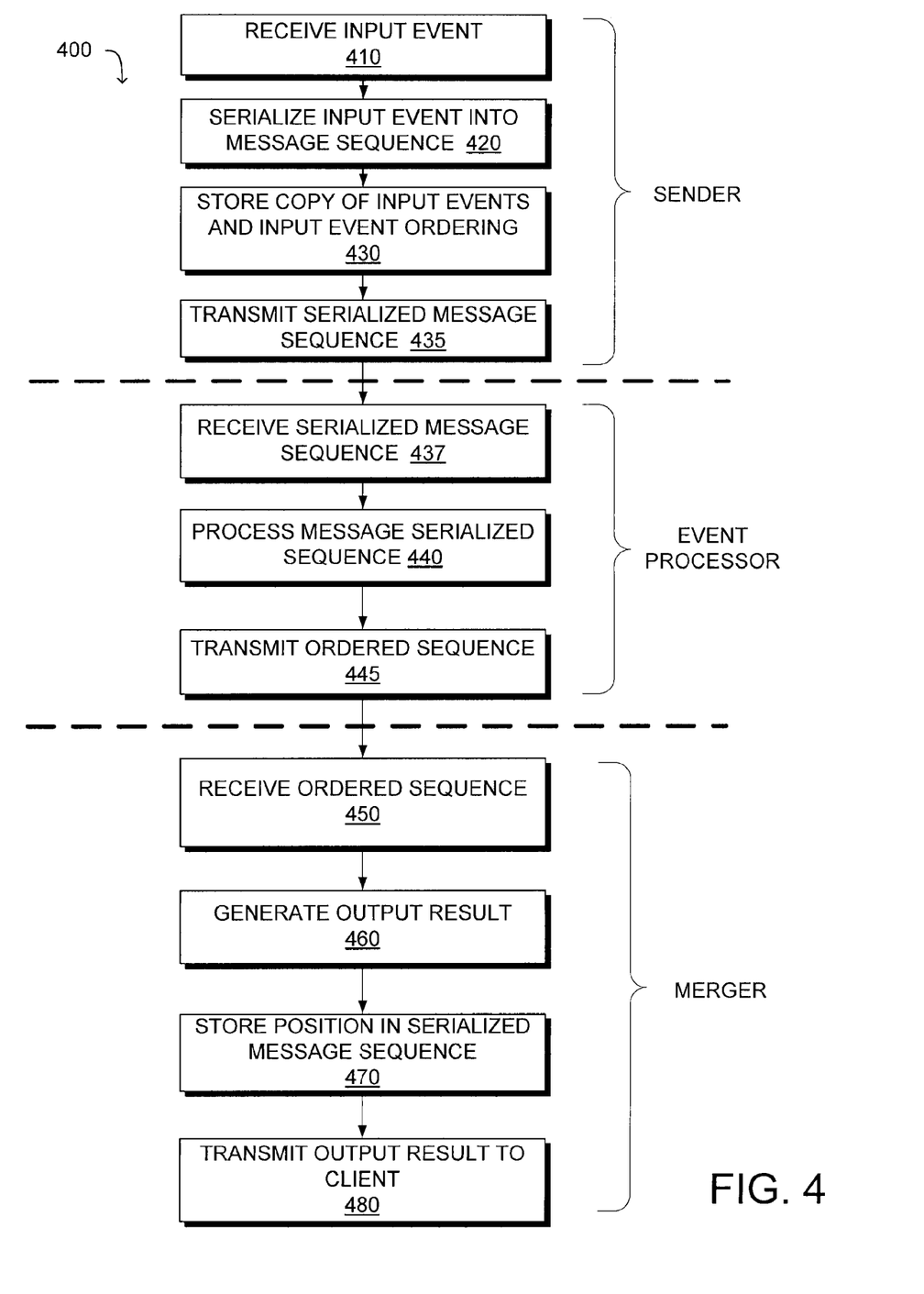
FIG. 4 is a flow chart of a method for replicating a distributed computer system state among multiple event processing engines according to one embodiment of the invention.

FIG. 4 is a flow chart of a method 400 for replicating a distributed computer system 100 state among multiple event processing engines 130A-L according to one embodiment of the invention. For purposes of illustration, FIG. 4 identifies certain steps as performed by the sender module 120, the event processing engines 130A-L and the merger module 140. However, these designations are merely for purposes of illustration and in other embodiments, the sender module 120, the event processing engines 130A-L and the merger module 140 are each capable of performing any step, or combination of steps, in the method 400 described by FIG. 4. Those of skill in the art will recognize that in other embodiments, the method can perform the steps of FIG. 4 in different orders or include different and/or additional steps than the ones described herein.

Initially, an input event or input event stream from an input client device 110A-M is received 410. In one embodiment, the sender module 120 receives 410 an input event from one or more input client devices 110A-M. The received input events are then serialized 420 into a serialized message sequence including multiple input events. In one embodiment, the input event is assigned a sequence number identifier indicating its position in the serialized message sequence. Hence, the serialized message sequence specifies the order in which received input events will be processed.

The received input event and the input event's position in the serialized message sequence are then stored 430. For example, the input event and associated sequence number are stored in the data store 240 of the sender module 120. Storage allows a copy of the received input event and the associated sequence number to be maintained for later retrieval if an error occurs. For example, if the sender module 120 does not receive an acknowledgement message from an event processing engine 130A-L for an serialized message sequence within a predetermined amount of time, the stored input event and sequence number are used to re-create the serialized message sequence and retransmit it to the event processing engine 130A-L that has not sent an acknowledgement message. In one embodiment, the input event and associated sequence number are stored in the data store 240 until all event processing engines 130A-L acknowledge that processing of an event is completed. In an alternate embodiment, the event data remains stored until a specified number of acknowledgement messages have been received. In yet another embodiment, the input event and associated sequence number are stored for a predetermined amount of time. In still another embodiment, the serialized message sequence including the input event and associated sequence number is stored.

After storing 430 the necessary data, the serialized message sequence is transmitted 435 to a plurality of event processing engines 130A-L for processing 440. In one embodiment, the serialized message sequence is received 437 by at least two event processing engines 130A-L and processed 440 by those event processing engines 130A-L. The output of the event processing, such as an ordered sequence of output messages, is then transmitted 445 from the event processing engines 130A-L.

A merger module 140 receives 450 an ordered sequence of output messages from the plurality of event processing engines 130A-L when the serialized message sequence is processed. As each event processing engine 130A-L is deterministic, the event processing engines 130A-L produce the same output, so the ordered sequences received include redundant data corresponding to the processing of the same serialized message sequence by multiple deterministic event processing engines 130A-L. However, because each event processing engine 130A-L produces the same ordered sequences responsive to a serialized message sequence, the system 100 availability is increased by allowing recovery of event processing results from multiple event processing engines 130A-L, reducing the effect of failure of any one event processing engine 130A-L.

The multiple redundant ordered sequences are used to generate 460 an output result or action. In one embodiment, the output result or action is generated 460 by removing redundant copies of the output result or action from multiple redundant ordered sequences to produce a single output result or action. This process is performed repeatedly for non-redundant ordered sequences to produce groups or subsets of output results or actions. In one embodiment, the output results or actions are also associated with output client devices 111A-N by the demultiplexer 320, allowing different output client devices 111A-N to receive different groups or subsets of output results or actions. For example, the demultiplexer 320 includes data associating an input event with one or more output client devices 111A-N, allowing different output client devices 111A-N to receive output results or actions associated with different input events. This allows output client devices 111A-N to receive specific, or customized, groups or subsets of output results or actions. Hence, generating 460 a group or subset of output results or actions allows output client devices 111A-N to receive output from the plurality of event processing engines 130A-L in the same manner as receiving output from a single, dedicated event processing engine 130A-L.

After generating 460 the output results or actions, the position in the serialized message sequence corresponding to the output result or action is stored 470 and the output result or action is transmitted 480 to an output client device 111A-N. In one embodiment, the serialized message sequence position is stored 470 until an acknowledgement message is received from the output client devices 111A-N. Storing the position in the serialized message sequence allows retransmission of output results or actions to one or more output client devices 111A-N starting from the stored position rather than from the beginning of the serialized message sequence.

Figure 5:
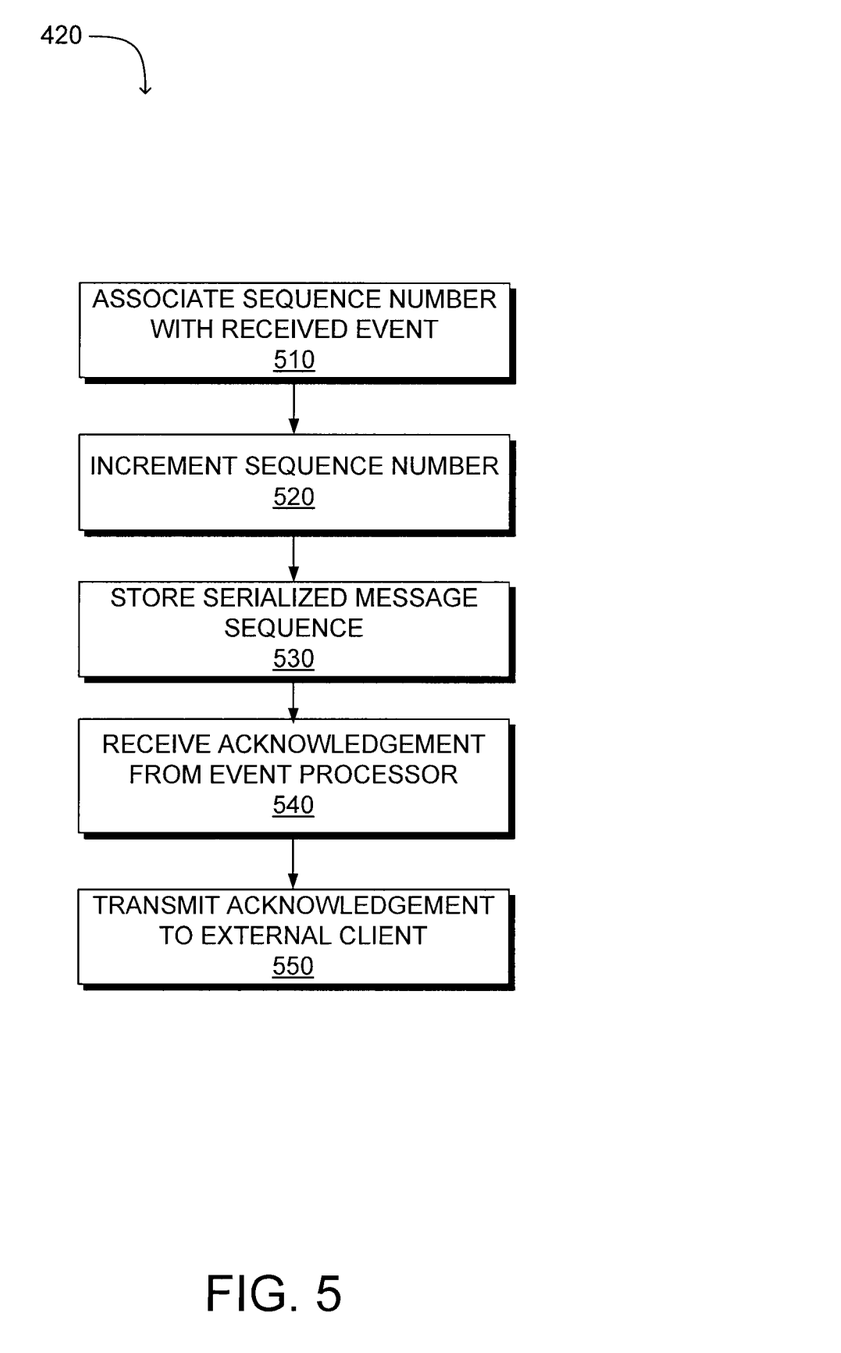
FIG. 5 is a flow chart of a method for generating a serialized message sequence according to one embodiment of the invention.

FIG. 5 is a flow chart of a method for serializing a plurality of input events into a serialized message sequence according to one embodiment of the invention.

Initially, a sequence number is associated 510 with the received input event. In one embodiment, the sequence number is initialized to a specific value, such as zero or one, so that the serialized message sequence has a specified starting value. After associating 510 the sequence number with the received input event, the sequence number is incremented 520 by a predetermined amount. In one embodiment, the sequence number is incremented monotonically, so that input events are assigned consecutive sequence numbers as they are received. For example, the first received event is associated with a sequence number of 1 and the sequence number is incremented by 1 so that the next received input event is associated with a sequence number of 2. Hence, the sequence numbers can be used to specify the order in which input events are processed.

The serialized message sequence is then stored 530 for subsequent access. In one embodiment, the sender module 120 stores 530 the serialized message sequence for retrieval in the event of an error. For example, an input event and the sequence number associated with the input event are stored 530 so input events can be retransmitted in order if errors occur during event processing. After an event processing engine 130A receives or processes an input event or input events in the serialized message sequence, the sender module 120 receives 540 an acknowledgement message from that particular event processing engine 130A. In one embodiment, after receiving 540 a predetermined number of acknowledgement messages from different event processing engine 130A-L (e.g., an acknowledgment from all event processing engines 130A-L or another suitable threshold value) indicating that the input event has been processed by multiple event processing engines 130A-L, the sender module 120 deletes the stored input event and its associated sequence number. This conserves resources by deleting input events after they are fully processed while maintaining high-availability by storing the input event until the corresponding output result is accessible from a plurality of event processing engines 130A-L. After receiving an acknowledgement message from the event processing engines 130A-L, the sender transmits or forwards 550 acknowledgement messages to the input client devices 110A-M indicating processing of the received input event by the event processing engines 130A-L.

Figure 6:
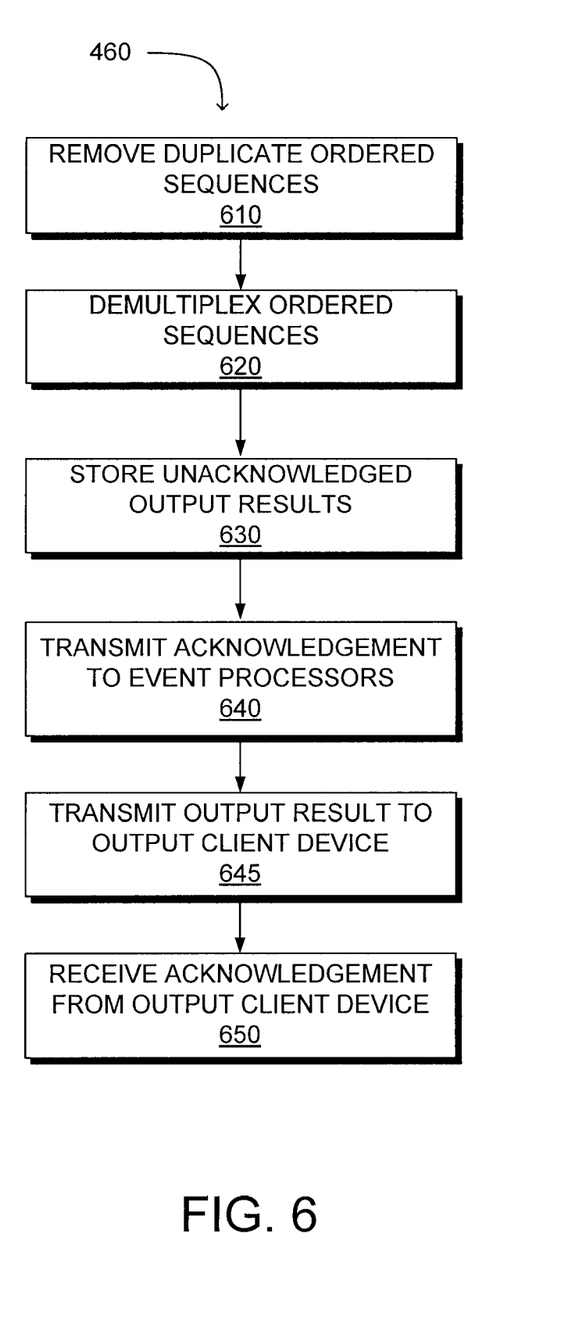
FIG. 6 is a flow chart of a method for generating an output result or action for a client device according to one embodiment of the invention.

FIG. 6 is a flow chart of a method for generating an output result or action for a client device 111A-N according to one embodiment of the present invention.

As multiple deterministic event processing engines 130A-L process a serialized message sequence, multiple ordered sequences of output messages are produced. Because the event processing engines 130A-L are deterministic, each event processing engine 130A-L produces the same ordered sequence. Rather than transmit redundant copies of an output result or action to each output client device 111A-N, redundant results or actions are initially removed 610 to produce a single copy of the output result or action for transmission to the output client devices 111A-N. For example, if N event processing engines 130A-L process a serialized message sequence, this should produce N ordered sequences of which N−1 ordered sequences are removed 610.

The remaining ordered sequence of output messages is then demultiplexed 620 for transmission to the appropriate output client devices 111A-N. The ordered sequences are first ordered according to the sequence number added by the sender module 120. Different output client devices 111A-N receive different subsets of the ordered sequence from the event processing engines 130A-L, so demultiplexing 620 the ordered sequence identifies the output messages, and thus the output results or actions, for the particular output client device 111A-N. In one embodiment, the demultiplexer 320 renumbers the sequence numbers for each subset of the ordered sequence so that the renumbering can be used to send the message to the output client device 111A-N in the correct order. In another embodiment, no renumbering is necessary and the output results or actions are send out to the desired output client device 111A-N according to their sequence number so long as the sequence numbers are in an order expected by the output client device 111A-N.

Output results or actions are then stored 630, enabling retransmission if errors occur. After storing 630 output results or actions, an acknowledgement is transmitted 640 to the event processing engines 130A-L. The acknowledgement indicates persistent storage of the output results or actions, such as by the merger module 140, allowing the event processing engines 130A-L to delete their locally stored copies of the ordered sequence. Once an ordered sequence is persistently stored 630, output client devices 111A-N are able to retrieve the output results or actions from the merger module 140. The stored output result or action is then transmitted 645 to the appropriate output client device(s) 111A-N. However, once an acknowledgement is received 650 from the appropriate output client device(s) 111A-N indicating that the output results or actions have been received or processed, the stored ordered sequence is modified. In one embodiment, receipt 650 of an acknowledgement causes deletion of the stored ordered sequence, conserving resources by removing output results or actions that have been received by the appropriate output client devices 111A-N.

Those of skill in the art will recognize that in various embodiments one or more of the methods described in FIG. 4 through FIG. 6 are implemented in hardware and/or software or combinations thereof. For example, instructions for performing one or more of the above-described methods are embodied or stored within a computer readable medium.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for complex event processing comprising:
 a sender module for receiving an input event and for generating a serialized message sequence from the input event;
 a plurality of deterministic event processing engines for processing the serialized message sequence and generating a plurality of redundant ordered sequences;
 a merger module for receiving the plurality of redundant ordered sequences and for generating an output result for transmission; and
 wherein at least one of the sender module, deterministic event processing engines and merger module comprises at least one hardware component.

2. The system of claim wherein the sender module stores a copy of the input event and an ordering of the input event.

3. The system of claim 2, wherein the sender module deletes the copy of the input event responsive to receiving an acknowledgement from one of the plurality of deterministic event processing engines.

4. The system of claim 2, wherein the sender module deletes the copy of the input event responsive to receiving an acknowledgement from all of the plurality of deterministic event processing engines.

5. The system of claim 1, wherein the merger module stores a copy of one of the plurality of redundant ordered sequences and a current position in the one of the plurality of redundant ordered sequences.

6. The system of claim 5, wherein the merger module deletes the copy of the one of the plurality of redundant ordered sequences responsive to receiving an acknowledgement.

7. A method executable by a processor of a computer for complex event processing, the method comprising:
 receiving an input event;
 generating a serialized message sequence including the received input event;
 processing the serialized message sequence using a plurality of event processing engines to generate a plurality of redundant ordered sequences; and
 generating an output result from one of the plurality of redundant ordered sequences.

8. The method of claim 7, wherein generating the serialized message sequence comprises:
 associating a first sequence number with the input event; and
 associating a second sequence number with a second input event.

9. The method of claim 8, wherein the second sequence number is greater than the first sequence number.

10. The method of claim 8 comprising:
 storing a copy of the input event in a persistent storage: and
 storing the first sequence number associated with the input event in the persistent storage.

11. The method of claim 10 comprising deleting the stored copy of the input event from the persistent storage and deleting the first sequence number associated with the input event from persistent storage.

12. The method of claim 7, wherein generating the output result comprises removing one or more redundant ordered sequences from the plurality of redundant ordered sequences.

13. The method of claim 12, wherein removing the one or more redundant ordered sequences comprises:
 identifying a sequence number; and
 discarding all but one ordered sequence from the plurality of redundant ordered sequences associated with the identified sequence number.

14. The method of claim 7, wherein generating the output result comprises associating the output result with an output client device.

15. The method of claim 7 comprising:
 storing a copy of the output result; and storing a sequence number associated with the output result.

16. The method of claim 15 comprising deleting the stored copy of the output result and deleting the sequence number associated with the output result.

17. The method of claim 7 comprising:
retrieving a state of one of the plurality of event processing engines; and
starting a new event processing engine with the received state.

18. The method of claim 17 comprising:
determining a point in processing of the serialized message sequence to which event processing has progressed; and
sending input events after the point in the serialized message sequence to the new event processing engine.

19. A computer program product for complex event processing, the computer program product comprising a non-transitory computer-readable medium containing computer program code for performing the method comprising:
receiving an input event;
generating a serialized message sequence including the received input event;
processing the serialized message sequence using a plurality of event processing engines to generate a plurality of redundant ordered sequences; and
generating an output result from one of the plurality of redundant ordered sequences.

20. The computer program product of claim 19, wherein generating the serialized message sequence comprises:
associating a first sequence number with the input event; and
associating a second sequence number with a second input event.

21. The computer program product of claim 20, wherein the second sequence number is greater than the first sequence number.

22. The computer program product of claim 19, wherein generating the output result comprises removing one or more redundant ordered sequences from the plurality of redundant ordered sequences.

23. The computer program product of claim 22, wherein removing the one or more redundant ordered sequences comprises:
identifying a sequence number; and
discarding all but one ordered sequence from the plurality of redundant ordered sequences associated with the identified sequence number.

24. The computer program product of claim 19, wherein generating the output result comprises associating the output result with an output client device.

25. The computer program product of claim 19 comprising:
retrieving a state of one of the plurality of event processing engines; and
starting a new event processing engine with the received state.

26. The computer program product of claim 25 comprising:
determining a point in processing of the serialized message sequence to which event processing has progressed; and
sending input events after the point in the serialized message sequence to the new event processing engine.

27. A system for complex event processing comprising:
a non-transitory computer-readable medium storing computer-executable code, the computer-executable code comprising:
a sender module for receiving an input event and for generating a serialized message sequence from the input event;
a plurality of deterministic event processing engines for processing the serialized message sequence and generating a plurality of redundant ordered sequences; and
a merger module for receiving the plurality of redundant ordered sequences, generating an output result for transmission and storing a current position (1) associated with the input event and (2) specifying a position of processing in one of the plurality of redundant ordered sequences.

* * * * *